United States Patent

Cheng

[11] Patent Number: 5,579,128
[45] Date of Patent: Nov. 26, 1996

[54] CONTACT IMAGE SENSOR AND ROLLER MOUNTING STRUCTURE FOR SCANNERS

[75] Inventor: John Cheng, Taipei Hsien, Taiwan

[73] Assignee: Silitek Corporation, Taipei, Taiwan

[21] Appl. No.: 538,356

[22] Filed: Oct. 3, 1995

[51] Int. Cl.[6] .................... H04N 1/40; H04N 1/04
[52] U.S. Cl. .................... 358/471; 358/496; 358/474
[58] Field of Search ...................... 358/474, 471,
358/496, 498, 401, 501, 494, 296, 484,
483, 482; 348/373; 359/198; 198/788, 791

[56] References Cited

U.S. PATENT DOCUMENTS

| | | | |
|---|---|---|---|
| 4,783,700 | 11/1988 | Nagane | 358/471 |
| 5,258,858 | 11/1993 | Chow | 358/484 |
| 5,261,013 | 11/1993 | Murata et al. | 358/471 |
| 5,278,677 | 1/1994 | Lee et al. | 358/482 |
| 5,489,995 | 2/1996 | Ise et al. | 358/483 |
| 5,528,410 | 6/1996 | Cheng | 359/198 |

Primary Examiner—Edward L. Coles, Sr.
Assistant Examiner—Fan Lee
Attorney, Agent, or Firm—Browdy and Neimark

[57] ABSTRACT

A contact image sensor and roller mounting structure including two end supports, a contact image sensor fixedly secured between the end supports, two roller holders respectively mounted on the end supports and turned about an axis, a roller connected between the roller holder and disposed in contact with the contact image sensor, a top cover connected between the roller holders and covered over the roller, and two torsional springs respectively mounted on the end supports to hold the roller holder in place, whereby opening the top cover causes the roller holders to move the roller away from the contact image sensor; closing the top cover causes the roller holders to move the roller back into contact with the contact image sensor.

1 Claim, 4 Drawing Sheets

CONTACT IMAGE SENSOR AND ROLLER MOUNTING STRUCTURE FOR SCANNERS

BACKGROUND OF THE INVENTION

The present invention relates to scanners, and relates more particularly to a contact image sensor and roller mounting structure which forces the roller into contact with the contact image sensor when the top cover is closed and, which permits the roller to be separated from the contact image sensor when the top cover is opened.

A variety of scanners have been intensively in offices used as an office automation equipment. Regular scanners commonly comprise a contact image sensor for picking up the image of the document to be scanned, and a roller disposed in contact with the contact image sensor and turned by a motor to deliver the document. These scanners are commonly complicated in structure. Because the roller and the contact image sensor are fixedly secured in place and disposed in close contact with each other, it is difficult to eliminate the source of trouble when paper jammed inside the mechanism.

SUMMARY OF THE INVENTION

It is one object of the present invention to provide a contact image sensor and roller mounting structure for scanners which is simple in structure and inexpensive to manufacture. It is another object of the present invention to provide a contact image sensor and roller mounting structure for scanners which is easy to maintain. According to the preferred embodiment of the present invention, the contact image sensor and roller mounting structure comprises two end supports, a contact image sensor fixedly secured between the end supports, two roller holders respectively mounted on the end supports and turned about an axis, a roller connected between the roller holder and disposed in contact with the contact image sensor, a top cover connected between the roller holders and covered over the roller, and two torsional springs respectively mounted on the end supports to hold the roller holder in place, whereby opening the top cover causes the roller holders to move the roller away from the contact image sensor; closing the top cover causes the roller holders to move the roller back into contact with the contact image sensor.

DETAILED DESCRIPTION OF THE PREFERRED EMBODIMENT

Figure 1:
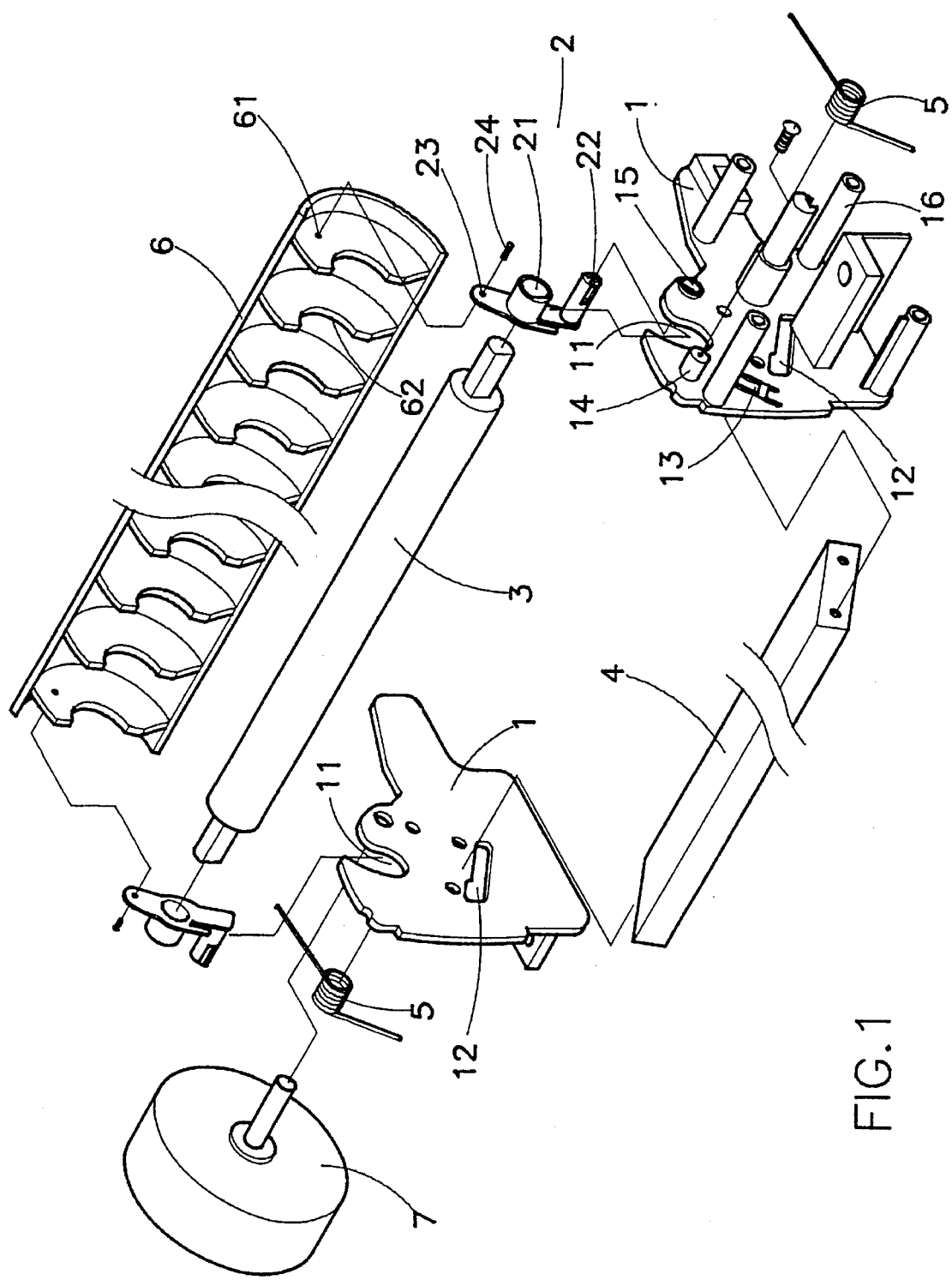
FIG. 1 is an exploded view of the contact image sensor and roller mounting structure according to present invention.
Figure 2:
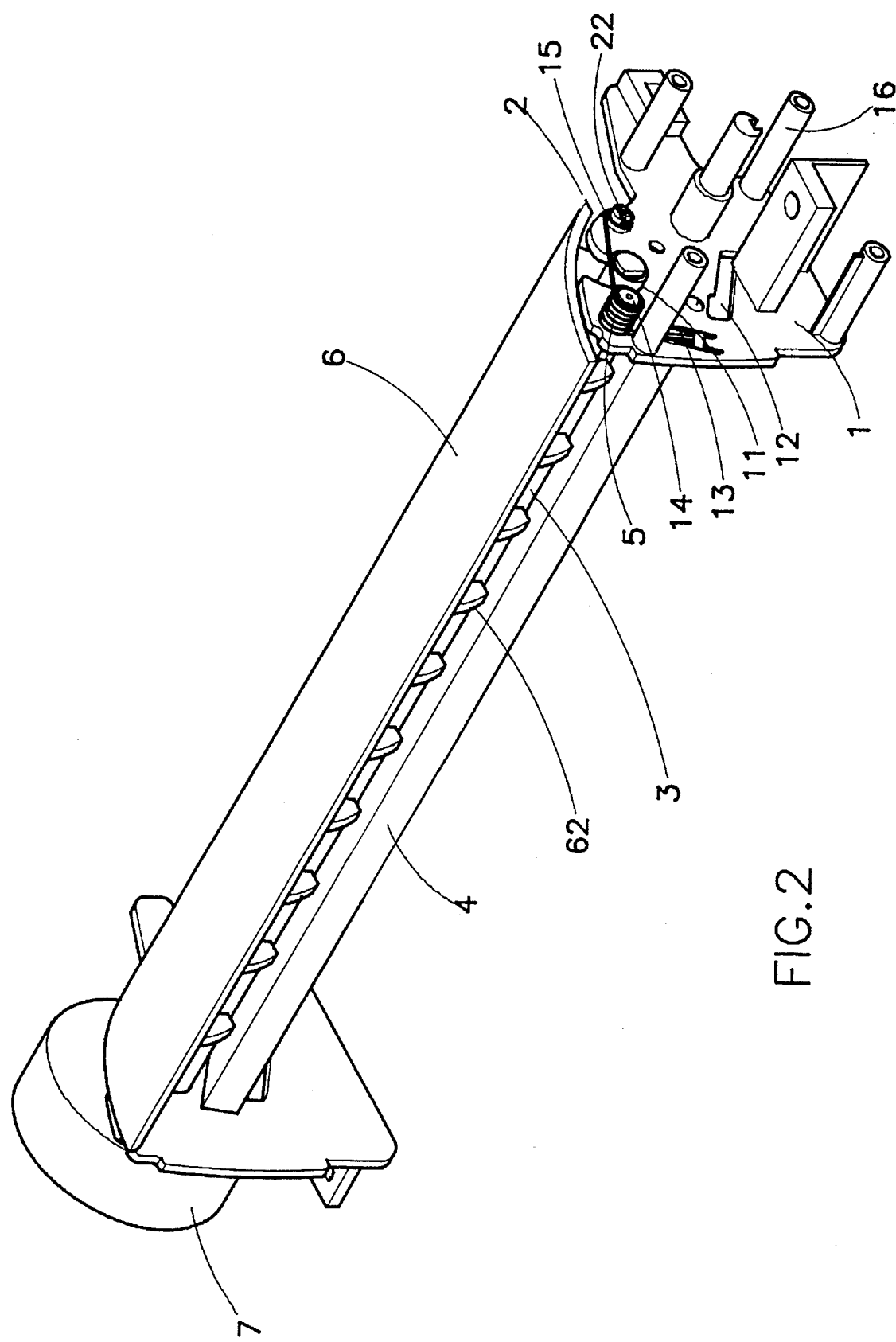
FIG. 2 is an elevational view of the contact image sensor and roller mounting structure shown in FIG. 1.

Referring to FIGS. 1 and 2, the contact image sensor and roller mounting structure mounting structure of the present invention comprises two opposite end supports 1, two roller holders 2, a roller 3, a contact image sensor 4, two torsional springs 5, a top cover 6, and a motor 7. Each of the end supports 1 comprises a sliding slot 11, a locating hole 12, a plug hole 13, a spring holder 14, an axle housing 15, and a locating post 16. Each of the roller holders 2 comprises an axle housing 21 mounted in the sliding slot 11 of one end support 1, a locating pin 22 inserted into the axle housing 15 of one end support 1, and a locating hole 23. The roller 3 has two opposite ends respectively fitted into the axle housings 21 of the roller holders 2. The contact image sensor 4 has two opposite ends respectively fastened to the locating holes 12 of the end supports 1, and is disposed in contact with the roller 3. The torsional springs 5 are respectively mounted on the spring holders 14 of the end supports 1, each having one end fastened to the plug hole 13 of one end support 1 and an opposite end stopped at the axle housing 21 of one roller holder 2 and the axle housing 15 of the respective end support 1. The top cover 6 has two locating holes 61 at two opposite ends respectively fastened to the locating holes 23 of the roller holders 2 by a respective screw 24, and a longitudinal series of arched contact surface portions 82 fitting the periphery of the roller 3. The motor 7 is mounted on one end support 1 and coupled to one end of the roller 3.

Referring to FIG. 2, when the top cover 6 is installed, it is retained in the closed position by the torsional springs 5, and the roller 3 is disposed in contact with the contact image sensor 4.

Figure 3:
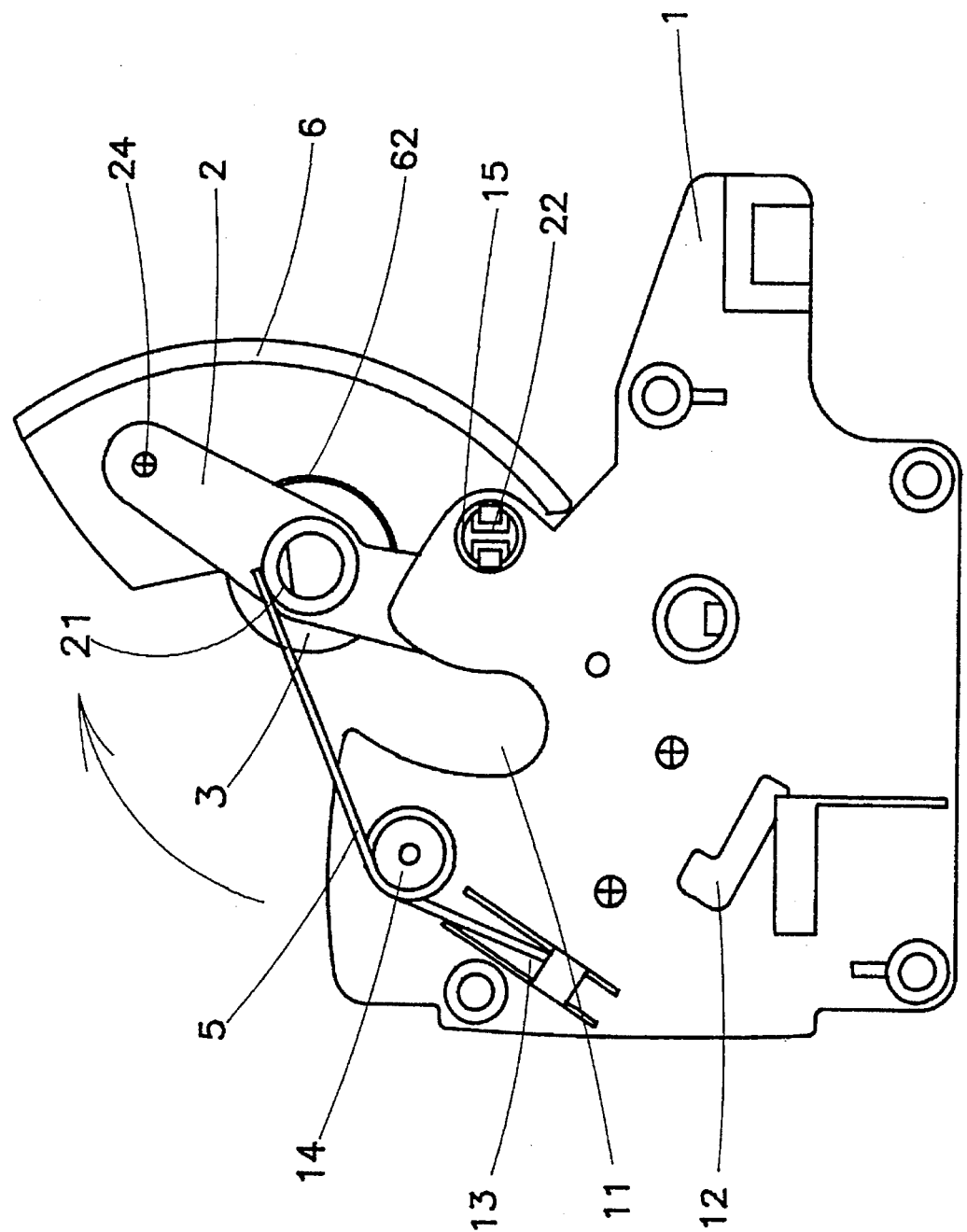
FIG. 3 is an end view in an enlarged scale of the contact image sensor and roller mounting structure shown in FIG. 1, showing the top cover opened.
Figure 4:
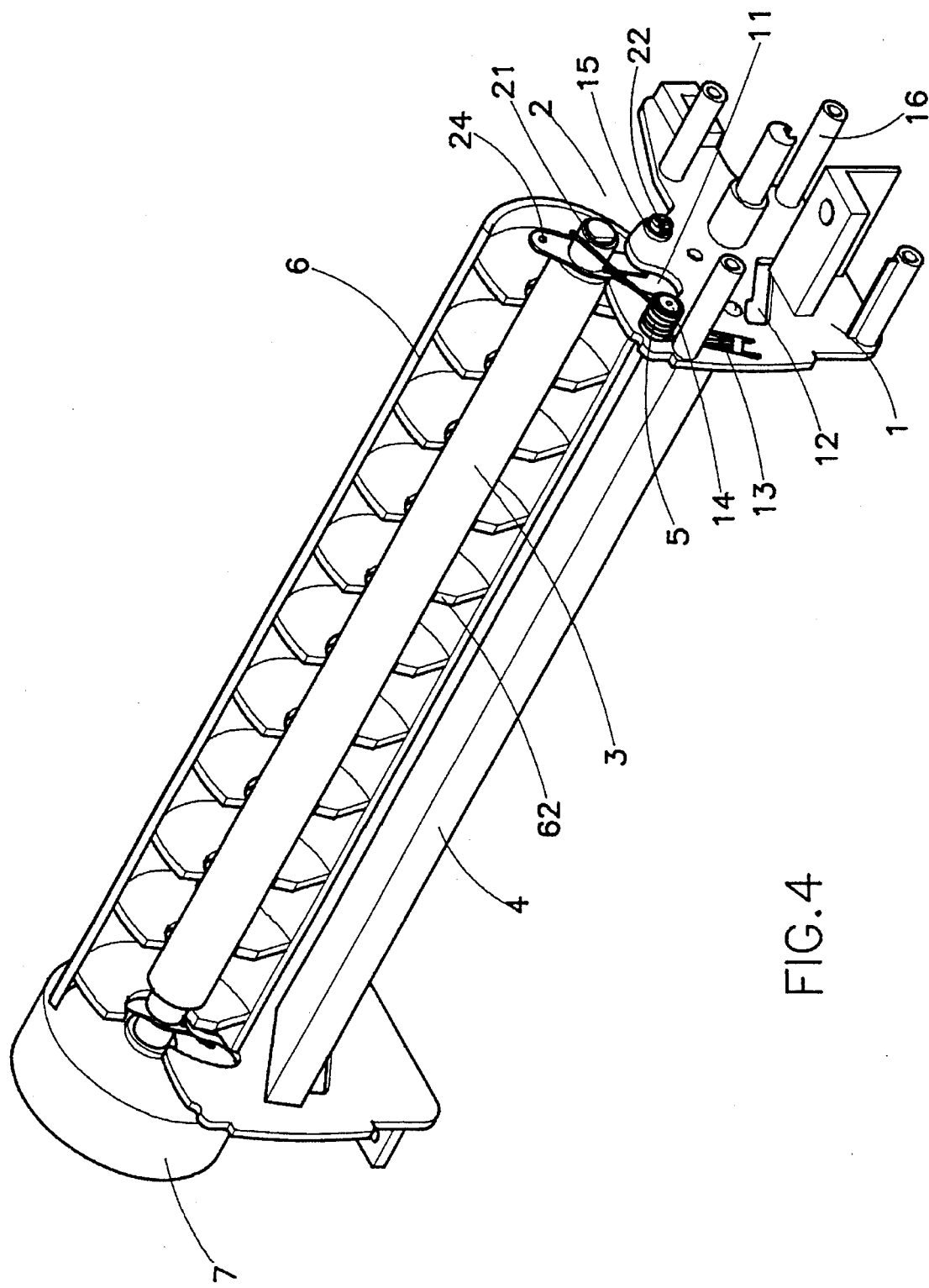
FIG. 4 is similar to FIG. 2 but showing the top cover opened, and the roller separated from the contact image sensor.

Referring to FIGS. 3 and 4, when the top cover 6 is turned outwards from the close position to the open position, the roller holders 2 are simultaneously driven by the top cover 6 to move the axle housings 21 out of the sliding slots 11, and therefore the roller 3 is moved away from the contact image sensor 4 for permitting the jammed paper to be moved away. When the top cover 6 is closed, the torsional springs 5 automatically force the roller holders 2 back to their former positions, and the axle housings 21 are returned to the sliding slots 11 again.

It is to be understood that the drawings are designed for purposes of illustration only, and are not intended as a definition of the limitations and scope of the invention disclosed.

I claim:

1. A contact image sensor and roller mounting structure, comprising:

two end supports, each end support comprising a sliding slot, a locating hole, a plug hole, a spring holder, an axle housing, and a locating post for mounting;

two roller holders respectively mounted on said end supports to hold a roller, each roller holder comprising an axle housing mounted in the sliding slot of one end support, a locating pin inserted into the axle housing of one end support, and a locating hole;

a roller having two opposite ends respectively fitted into the axle housings of said roller holders;

a contact image sensor having two opposite ends respectively fastened to the locating holes of said end supports, and being disposed in contact with said roller;

two torsional springs respectively mounted on the spring holders of said end supports, each having one end fastened to the plug hole of one end support and an opposite end stopped at the axle housing of one roller holder and the axle housing of the respective end support;

a top cover connected between said roller holders and covered over said roller, having two locating holes at two opposite ends respectively fastened to the locating holes of said roller holders by a respective fastening element, and a longitudinal series of arched contact surface portions fitting the periphery of said roller; and a motor mounted on one end support and coupled to one end of said roller for turning it to deliver a document.

* * * * *